United States Patent
Cieplinski et al.

(10) Patent No.: US 7,400,747 B2
(45) Date of Patent: Jul. 15, 2008

(54) METHOD AND APPARATUS FOR REPRESENTING MOVING OBJECTS IN A SEQUENCE OF IMAGES

(75) Inventors: Leszek Cieplinski, Guildford (GB); Homam Dabis, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 630 days.

(21) Appl. No.: 10/694,887

(22) Filed: Oct. 29, 2003

(65) Prior Publication Data
US 2004/0165751 A1    Aug. 26, 2004

(30) Foreign Application Priority Data
Nov. 7, 2002   (EP)  .................................. 02257726

(51) Int. Cl.
*G06K 9/00* (2006.01)
(52) U.S. Cl. ........................ 382/107; 382/103; 382/190; 382/201; 382/241; 715/723; 345/473; 345/474; 345/421; 345/619; 707/3; 707/4; 707/5; 707/6; 711/115; 348/699; 348/171; 348/172
(58) Field of Classification Search .................. 382/107, 382/103, 190, 218, 241, 201; 345/473–475, 345/421, 619; 715/723; 385/218; 348/699, 348/171, 172; 711/115; 375/240.16; 707/3–6
See application file for complete search history.

(56) References Cited

U.S. PATENT DOCUMENTS

| | | | | |
|---|---|---|---|---|
| 5,694,487 | A * | 12/1997 | Lee ............................ | 382/201 |
| 6,005,639 | A * | 12/1999 | Thomas et al. .............. | 348/699 |
| 6,487,313 | B1 * | 11/2002 | De Haan et al. ............. | 382/236 |
| 7,091,988 | B2 * | 8/2006 | Hori et al. ................... | 345/619 |
| 2001/0025298 | A1 | 9/2001 | Masukura et al. | |
| 2001/0040924 | A1 | 11/2001 | Hori et al. | |
| 2002/0159637 | A1 * | 10/2002 | Echigo et al. ............... | 382/190 |

FOREIGN PATENT DOCUMENTS

| EP | 1 154 379 A2 | | 11/2001 |
|---|---|---|---|
| GB | WO00/67203 | * | 11/2000 |
| JP | 1154 379 A2 | * | 5/2001 |

\* cited by examiner

*Primary Examiner*—Andrew W. Johns
*Assistant Examiner*—Nancy Bitar
(74) *Attorney, Agent, or Firm*—Birch, Stewart, Kolasch & Birch, LLP

(57) ABSTRACT

A method of representing motion of an object appearing in a sequence of images comprises deriving for each image a set of representative points representing the location of the object, deriving an approximate function representing the trajectory of a representative point in two or more of said sequence of images, and calculating an error value for said approximate function for the representative point for an image, characterised in that the error value is based on the difference between the area of the object as represented by the representative point and the area of the object with the representative point replaced by the respective approximate function value.

11 Claims, 7 Drawing Sheets

METHOD AND APPARATUS FOR REPRESENTING MOVING OBJECTS IN A SEQUENCE OF IMAGES

BACKGROUND OF INVENTION

The invention relates to an improved method and apparatus for representing moving objects appearing in a sequence of images.

There are various known techniques for deriving representations of objects in an image or sequence of images. Such representations are useful, for example, for indexing images for search and retrieval purposes. Text-based indexing, which is subjective and labour-intensive, was followed by indexing on the basis of intrinsic properties of objects such as colour, shape and outline. A further development has been the representation of motion of an object in a sequence of images. A very important aspect of such a representation is an efficient encoding that minimises the bandwidth or storage required while introducing minimal approximation error.

A first known technique of representing motion is known as Parameter Trajectory. In this technique, motion of the entire object is represented using one or more parameters, such as rotation and translation. For example, displacement vectors between vertices in a frame and a reference frame are derived, and used to solve equations for the known motion model, such as an affine transformation motion. This technique results in a relatively compact representation, but is limited to rigid objects and where the motion model (eg affine transformation) is known.

Another known technique of representing motion is known as Figure Trajectory. In this technique, motion of an object is represented by the trajectories of each of a number of representative points independently. More specifically, the co-ordinates of each representative point are tracked through a sequence of frames, and a function approximating the trajectory of each coordinate for each representative point is derived. The function approximation is performed using known techniques, such as linear approximation, quadratic approximation or spline function approximation. Figure Trajectory can also be used for various types of motion including motion of rigid objects with an unknown and/or complex motion.

In both techniques, if an object has a relatively complex outline, it can be represented by a reference region, such as a rectangle, ellipse or polygon, which is an approximation of the more complex object outline. For a polygon, the representative points may be the vertices. Similarly, for a rectangle, the representative points may be limited to three of the four vertices, because the position of the fourth vertex can be calculated from the position of the other three vertices. For an ellipse, three vertices of the circumscribing rectangle may be selected as representative points.

Published applications U.S.2001/0040924 and U.S. 2001/0025298 disclose methods of representing motion of an object in a sequence of images similar to Figure Trajectory and Parameter Trajectory as outlined above. Each of U.S. 2001/0025298 and U.S. 2001/0040924 also discloses in more detail how a representative region of an object is derived (polygon approximation algorithm) and how representative points in a frame are associated with representative points in another frame (correspondence determination algorithm).

In Figure Trajectory, the function approximation, known as temporal interpolation algorithm, involves extending the interval of an approximation function until an extraction error threshold (EET) is greater than a predetermined threshold.

In the algorithm, the interpolation is initialised with the first two points. The interpolation is then widened to add one point at a time until the EET of the interpolation becomes larger than a predefined threshold. At that point a new interpolation interval is started. This procedure is iterated until all points have been processed. When the interpolation model matches the variable values well, this algorithm results in a small number of long interpolation intervals. Conversely, when the match is poor, a large number of short interpolation intervals will result.

To describe the algorithm formally, define the following notation. Let d (>0) be the number of variables (dimension) and denote the value of the j-th variable at time t by $v_t^{(j)}$ (j=1, 2, ... ,d). A series of time points is denoted by $t_i$ (i=0,1, ... ). For a (candidate) interpolation interval, the starting time (ending time) is denoted by $t_{START}$ ($t_{END}$). Let $f_{t_{START}t_{END}}^{(j)}(t)$ (j=1,2, ... ,d) be a candidate of the j-th variable interpolation function. This can be calculated using least squares. In this case, $f_{t_{START}t_{END}}(t)$ is calculated to minimize $$\sum_{i=START}^{END} |v_{t_i}^{(j)} - f_{t_{START},t_{END}}^{(j)}(t_i)|^2.$$

where the interpolation function is a first or second order polynomial. To evaluate the derived candidate function, let $T_j$ to be a threshold for the j-th variable and define error $e^{(j)}$(j=1, 2, ... ,d) as $$e^{(j)} = \max_{START \le i \le END} |v_{t_i}^{(j)} - f_{t_{START},t_{END}}^{(j)}(t_i)|.$$

$e^{(j)}$ is the maximum approximation error of the j-th variable in the range $t_{START} \le t_i \le t_{END}$. If $e^{(j)} < T_j$ holds for all j, $f_{t_a t_b}^{(j)}(t)$ is an acceptable candidate. However, another interpolation function in wider interval may be found. To try to test this possibility, the interval is widened by incrementing END and a new function is derived and tested. This procedure is repeated until a newly derived function meets the acceptance condition. Then, the last candidate function is accepted.

A similar technique is disclosed in U.S. 2001/0040924.

SUMMARY OF INVENTION

An object of the invention is to improve the accuracy of the representation of motion, especially in the case of Figure Trajectory.

Accordingly, the invention provides a method of representing motion of an object appearing in a sequence of images, by processing signals corresponding to the images, the method comprising deriving for each image a set of representative points representing the location of the object, deriving an approximate function representing the trajectory of a representative point in two or more of said sequence of images, and calculating an error value for said approximate function for the representative point for an image, characterised in that the error value is based on the difference between the area of the object as represented by the representative point and the area of the object with the representative point replaced by the respective approximate function value.

The overall trajectory of each representative point through a set of images is represented by an approximate function, or set of approximate functions, and the error value is used to determine these approximate functions, including their start and end points.

The approximate functions are used to form a descriptor of the motion of an object through a sequence of images. Thus, an object descriptor for any image in the sequence can be interpolated.

The representative points may, for example, be vertices of figures such as polygons, rectangles, ellipses approximating the object outline. Preferably, the method includes the step of deriving a correspondence between representative points in the images in the sequence.

As a result of the invention, an improved, more accurate representation of the object motion can be derived.

DESCRIPTION OF DRAWINGS

An embodiment of the invention will be described with reference to the accompanying drawings, of which.

DETAILED DESCRIPTION

Figure 1:
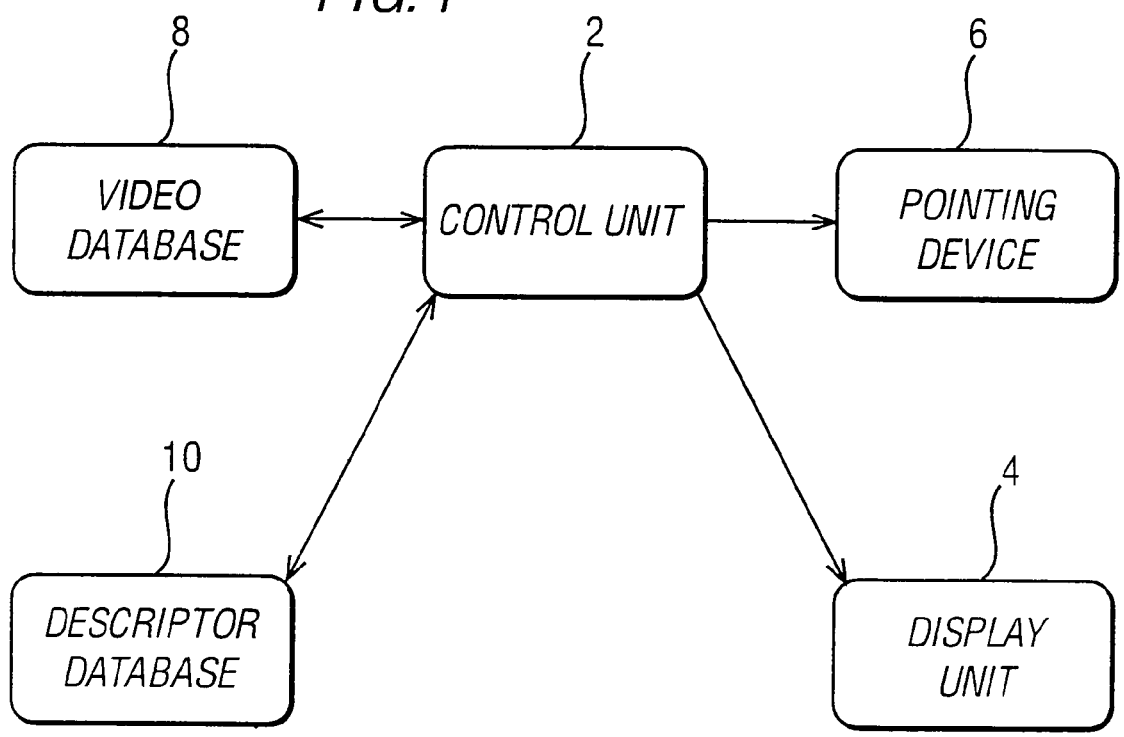
FIG. 1 is a block diagram of a video database system.

FIG. 1 shows a computerized video database system according to an embodiment of the invention. The system includes a control unit 2 in the form of a computer, a display unit 4 in the form of a monitor, a pointing device 6 in the form of a mouse, a video database 8 including stored sequences of images constituting moving images (described as videos in the following) and a descriptor database 10 storing descriptors of objects or parts of objects appearing in images stored in the video database 8.

Descriptors of images and objects appearing in images in the video database are derived by the control unit 2 and stored in the descriptor database 10. The control unit 2 derives the descriptors operating under the control of a suitable program. Numerous types of descriptors are known and may be used such as descriptors of the colour, shape and outline of an object in an image, as described elsewhere in the art. The description of the present embodiment will concentrate on deriving a motion descriptor for an object in a video.

The technique of the present embodiment is based on Figure Trajectory, mentioned above, and a brief summary of some of the features of Figure Trajectory will be given first.

Figure 2:
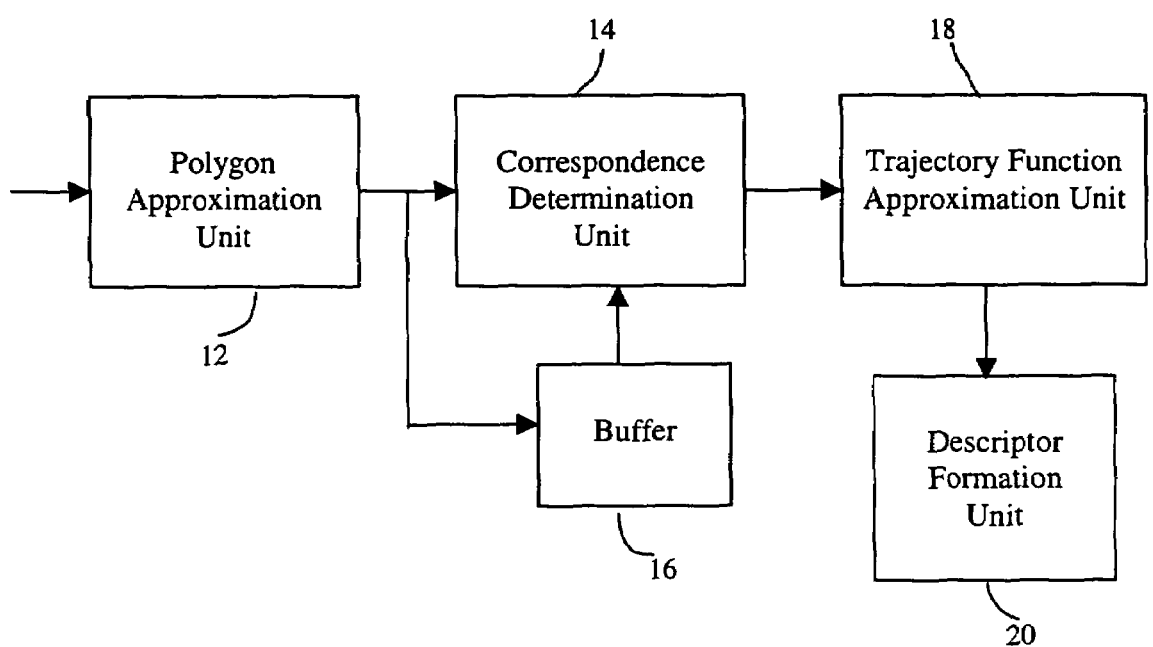
FIG. 2 is a block diagram of components of the control unit of the system of FIG. 1.

FIG. 2 shows functional components of the control unit 2. These may be implemented in software and/or hardware form as desired. The control unit 2 includes a polygon approximation unit 12 which receives input images and derives a polygon approximation of the outline of an object in the image, as described in more detail below. The output of the polygon approximation unit 12 is input to a buffer 16 and a correspondence determination unit 14. The correspondence determination unit 14 is for determining the correspondence between vertices of a polygon in a current frame with the vertices of a polygon in another frame, as described in more detail below. The output of the correspondence determination unit 14 is input to a trajectory function approximation unit 18, which is for determining approximate functions representing the trajectory of each polygon vertex through a sequence of frames. The function approximation will be described in more detail below.

The output of the trajectory function approximation unit 18 is input to a descriptor formation unit 20, which forms a descriptor from the trajectory functions.

Figure 3:
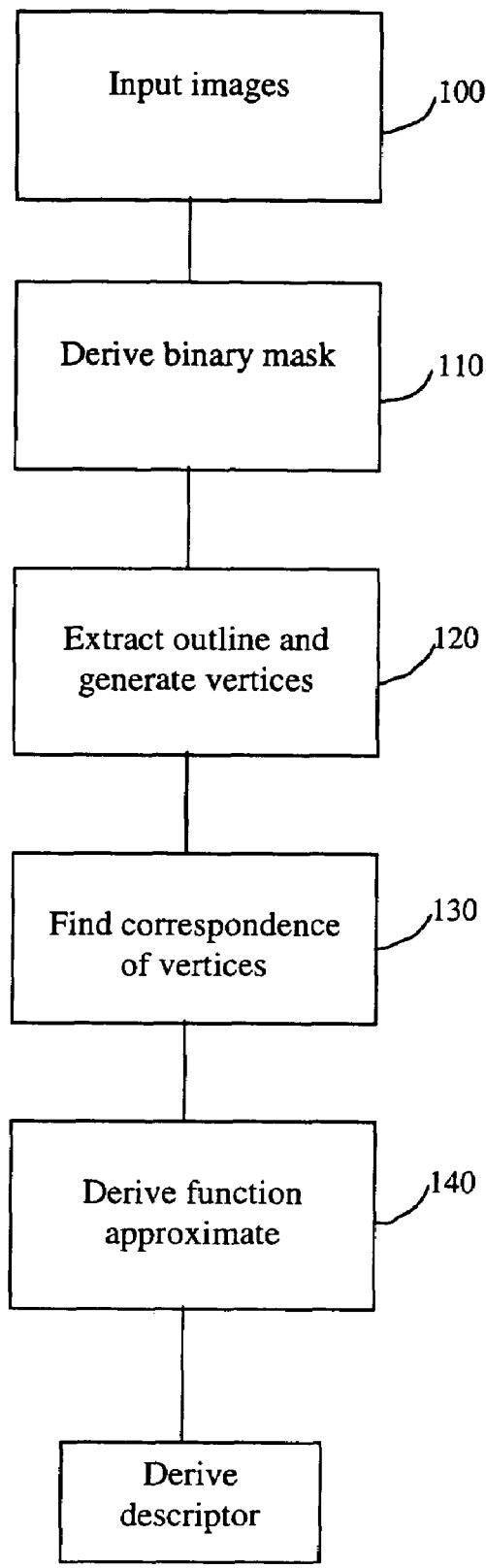
FIG. 3 is a flow diagram of a method of deriving a representation of motion of an object.

A flow diagram in FIG. 3 illustrates the steps of the method of deriving a representation of motion of an object in a sequence of images.

Figure 4:
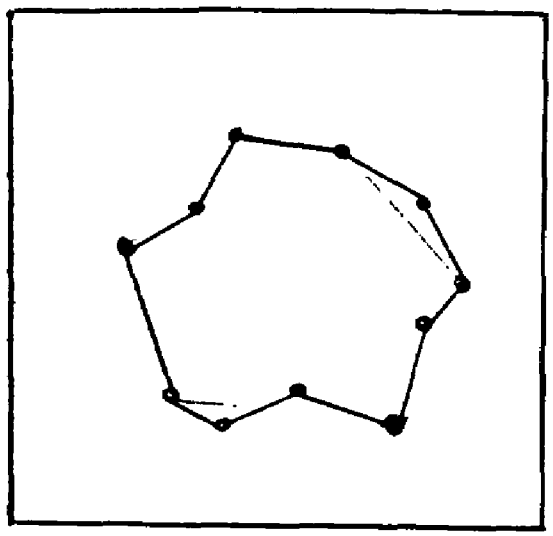
FIG. 4 is a diagram illustrating a binary mask of an object in an image.

In step 100, each image of a sequence of images containing an object of interest is input to the polygon approximation unit 12. In step 110, for each image, a binary mask is derived for the object. This is illustrated in FIG. 4. More specifically, for each pixel, if the pixel is part of the object of interest, the pixel is set to a first value, set as black in FIG. 4, and if the pixel is not part of the object of interest, the pixel is set to a second value, shown as white in FIG. 4, resulting in a binary mask.

Figure 5:
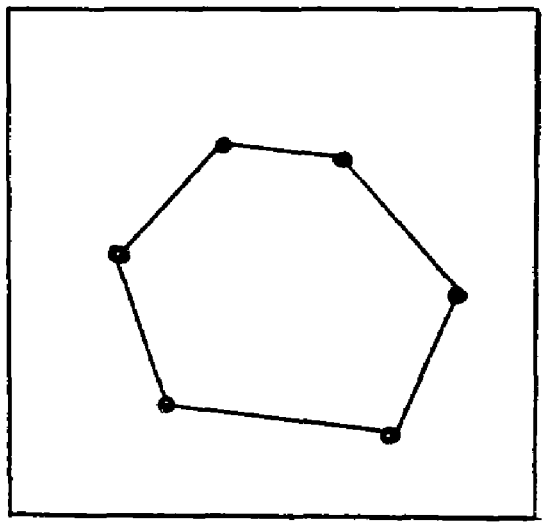
FIG. 5 is an object illustrating a polygon approximation of the outline of the object shown in FIG. 4.

In step 120, the outline of the object is extracted and vertices of an approximation polygon are generated. The outline of the object may already be in the form of a simple polygon, such as a pentagon or hexagon. However, usually the object outline will be much more complicated, which would substantially increase the amount of processing required. Accordingly, the outline of the object is approximated by a polygon. This can be done, for example, by smoothing the object outline, as described in eg U.S.2001/0040924 and U.S. 2001/0025298, or by matching and modifying polygons having a predetermined number of vertices. Further details on polygon approximation can be found, for example, in U.S.2001/0040924 and U.S. 2001/0025298. FIG. 5 shows a polygon approximation of the object outline of FIG. 4. The polygon approximation in this case is a hexagon.

In this example, it is assumed that the polygon approximation of the object in each frame has the same number of vertices, although this is not necessarily the case.

For a given frame, the polygon approximation is output from the polygon approximation unit 12 and input both to the buffer 16 for temporary storage and also to the correspondence unit 14. More specifically, the co-ordinates of the vertices of the approximation polygon in the image are input.

Then, in step 130, a correspondence between the polygon vertices of the current image and the polygon vertices in the previous image are found.

Figure 6:
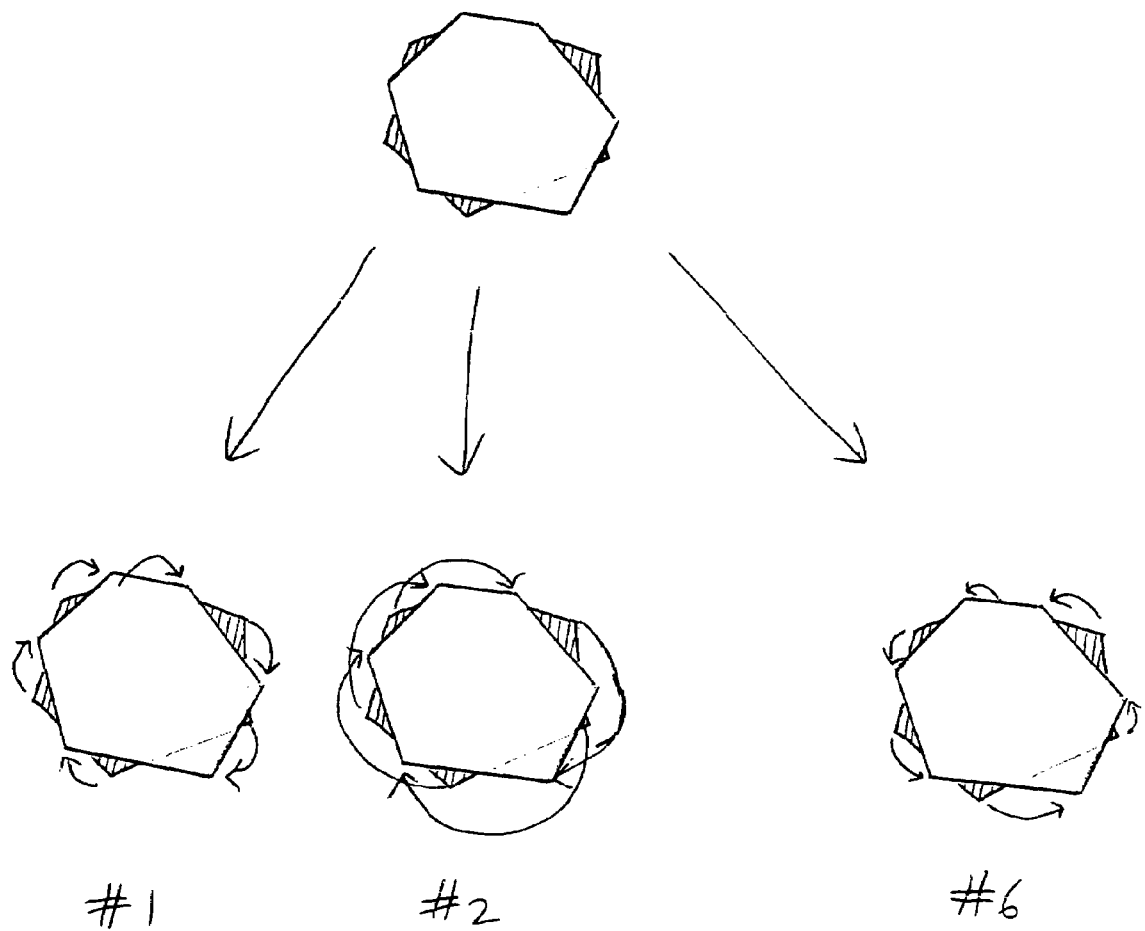
FIG. 6 is a diagram illustrating the step of deriving correspondence between vertices of object outlines.

FIG. 6 shows the position of a polygon (hexagon) in a first image at time t and the position of the polygon in a subsequent image at time t'. The aim is to determine which vertex in the image at time t corresponds to which vertex in the image at time t'. It will be understood that, as the polygon is a hexagon, there are 6 possible correspondence combinations. In other words, each polygon vertex in the first frame may simply be mapped to the closest vertex in the subsequent frame, or there may have been a rotation of various degrees, eg by one vertex, two vertices etc.

Methods of determining vertex correspondence is described in more detail in U.S.2001/0040924 and U.S. 2001/0025298

For each vertex, the co-ordinates of the vertex in each image are linked, using the results of the vertex correspondence determination unit. These coordinates represent the trajectory of each vertex.

In the next step, step 140, a function approximation of the trajectory of the vertices is derived.

In this embodiment, each vertex is examined independently and furthermore each co-ordinate is treated separately.

Figure 7:
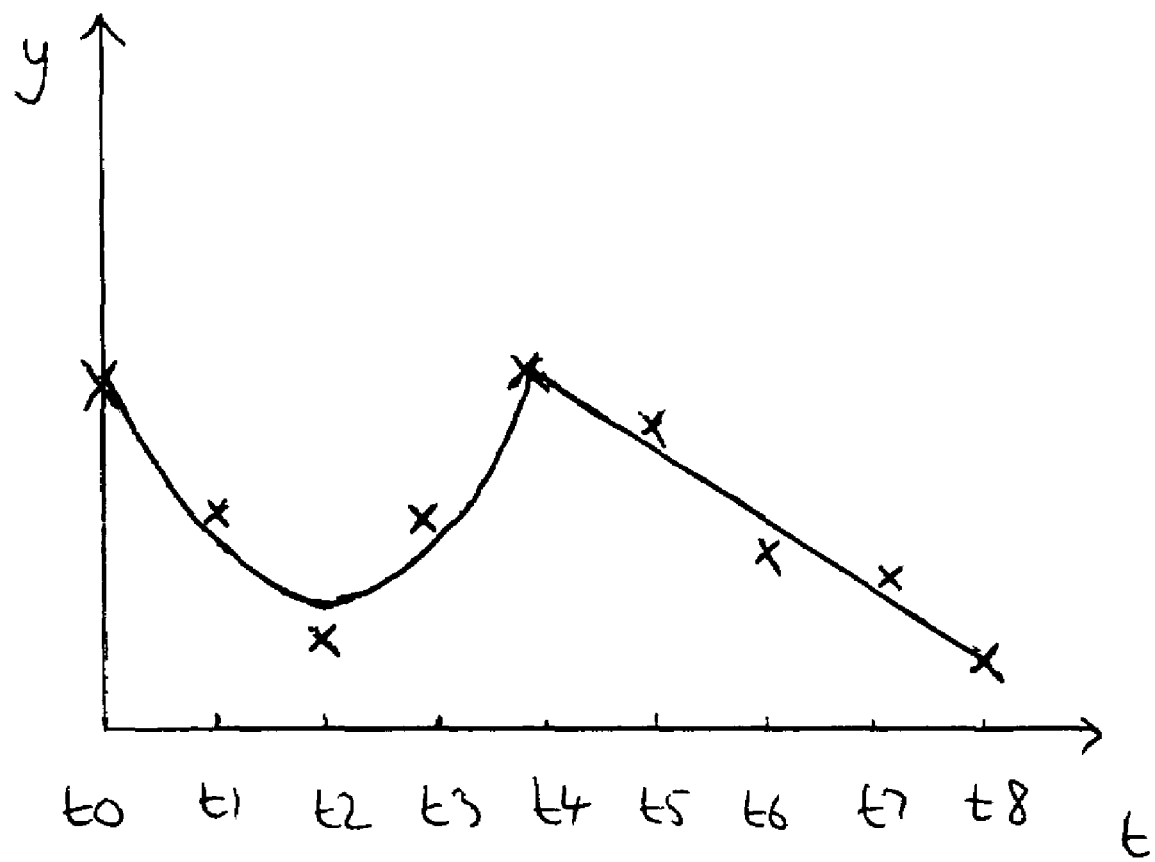
FIG. 7 is a diagram illustrating the variation of a vertex co-ordinate at time intervals corresponding to a sequence of images.

FIG. 7 is a graph showing the values of the y co-ordinates for a given vertex (vertex A in FIG. 8) at various times t0 to t8, each time point corresponding to an image. The curves shown on the graph are examples of approximation functions over intervals t0 to t4 and t4 to t8.

Approximation functions are derived using any suitable known technique, such as linear or quadratic approximation or spline function approximation.

In this embodiment, the algorithm is similar to the algorithm discussed above in the discussion of the prior art, apart from a difference in the calculation and evaluation of the candidate function and the error.

In the algorithm, the interpolation is initialised with the first two points. The interpolation is then widened to add one point at a time until the EET of the interpolation becomes larger than a predefined threshold. At that point a new interpolation interval is started. This procedure is iterated until all points have been processed.

To describe the algorithm formally, define the following notation. Let d (>0) be the number of variables (dimension) and denote the value of the j-th variable at time t by $v_t^{(j)}$ (j=1, 2, ..., d). A series of time points is denoted by $t_i$ (i=0,1, ...). For a (candidate) interpolation interval, the starting time (ending time) is denoted by $t_{START}$ ($t_{END}$). Let $f_{t_{START}, t_{END}}^{(j)}(t)$ (j=1,2, ..., d) be a candidate of the j-th variable interpolation function. This can be calculated using least squares. In this case, $f_{t_{START}, t_{END}}^{(j)}(t)$ is calculated to minimize $$\sum_{i=START}^{END} |v_{t_i}^{(j)} - f_{t_{START}, t_{END}}^{(j)}(t_i)|^2.$$

where the interpolation function is a first or second order polynomial.

The time interval of the candidate function is extended iteratively.

In the present example, a candidate function for the y co-ordinate of vertex A is being derived. Suppose a candidate function approximation f has been derived as outlined above for a time interval t=S to t=E−1. Then t is set to E, and the value of the candidate function f for t=E is determined. In other words, it is attempted to extend the derived function approximation to t=E. Then the resulting error is calculated.

The resulting error is calculated as follows, with reference to FIG. 8.

Figure 8:
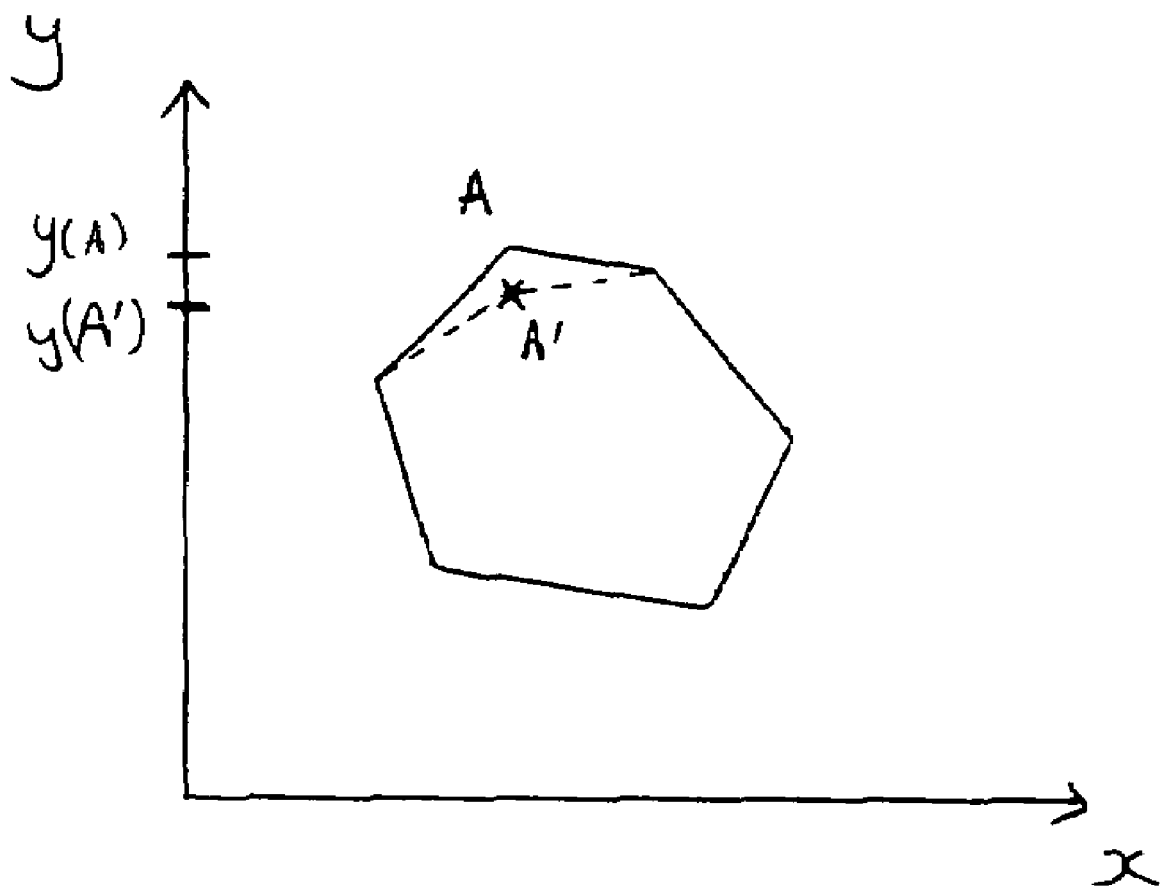
FIG. 8 is a diagram illustrating the calculation of an approximation error.

FIG. 8 shows as a solid line the object outline with vertices as determined in step 120 above for the image at time E. FIG. 8 also shows as a cross the position of a vertex with the original y value replaced by the value of the function approximation at time E. The dashed lines show the object outline with the modified vertex values.

As can be seen in FIG. 8, the area of the polygon changes as a result of the modification of one of the vertices. In this embodiment, the error value is the difference between the area of the original polygon and the modified polygon. More specifically, in this embodiment, the difference in area for time t is calculated using the following equation:

$$D_t = \sum_{i=0}^{I} P_{OR}^t(i) \qquad (1)$$

where i indexes the pixels in the image and $P_{OR}$ (i) takes the value 1 if pixel i is within the original object outline but not the modified object outline, or if pixel i is within the modified object outline but not within the original object outline (ie if the modified object outline is outside the original object outline). This gives an indication of the difference in area. For pixels which are partially in one area but not the other $P_{OR}$ (i) can be set to one or zero as desired. As only one variable (y) is being varied, the modified object outline will be either wholly within or wholly outside the original outline.

Other equations can be used for calculating the difference in area. For example, the error over the extended interval may be calculated and compared with a threshold, eg using the following equation:

$$D_t' = \sum_{t=S}^{E} \sum_{i=0}^{I} P_{OR}^t(i) \qquad (2)$$

Where S and E are the start and finish points respectively of the function approximation. In other words, the total error over the interval of the function approximation is considered to test the appropriateness of the function approximation. The resulting error value is compared with a predetermined threshold. If the error value is less than the threshold, the function approximation is extended to time E+1, and the procedure is repeated. Alternatively, for example, the maximum error $D_t$ from equation (1) in a time interval t=S to t=E can be compared with a threshold.

If the error value for t=E is greater than the threshold, the function approximation is terminated at t=E−1. A new function approximation is begun at t=E−1 with an initial end point as t=E. This function approximation is also tested with an error calculated as outlined above.

The initial function is also tested with an error calculated as outlined above.

The steps above are repeated for all values of t in the sequence of images, resulting in a set of functions approximating the trajectory for the y co-ordinates of a vertex.

As shown in FIG. 7, in the present case, the above steps result in two candidate functions.

The same steps are performed for the x co-ordinates of the same vertex.

The functions for the x and y co-ordinates of a vertex can be combined to form a description of the trajectory of the vertex.

The above steps are repeated for each co-ordinate of each vertex, resulting in trajectory descriptions for each vertex.

The trajectory descriptors for all the vertices are combined to form a descriptor of the motion of the object.

As shown in FIG. 8, the error according to the prior art technique corresponds to the 1-dimensional difference between y(A) and y(A'), whereas the present embodiment reflects the change in area of the object as a result of the modification of the y, which is more accurate in terms of representation of motion of an object.

Instead of extending the interval of the pre-calculated function, it is possible that there is another candidate function that fits the points from t=S to t=E. This possibility can be tested by least squares as discussed above for the longer interval, testing the resulting area error for each value of t from t=S to t=E using the equation above. If the area error is less than a predetermined threshold for each value of t, that candidate function may be selected instead of the previous candidate function. To choose between the two, the overall area, ie the sum of the area error for all values of t in the interval may be compared, with the candidate function with the smallest overall error selected. Similarly, a candidate function could be derived by considering the time interval from t=S to the maximum value of t, finding a candidate function and testing the resulting area errors for all t. If the maximum area error for a value of t is greater than a predetermined threshold, then the maximum value of t is decreased by one and the procedure is repeated until a suitable candidate function is found. Then that value of t can be set as t minimum and the procedure repeated.

In the above embodiments, the function approximation is calculated for each co-ordinate for each vertex separately. This is a relatively coarse approximation which nonetheless improves the quality of the motion description compared with the prior art.

An advanced algorithm analyses all the vertices simultaneously in a recursive fashion to improve the approximation. Another approach would require all the key parts (start and end points) of the function approximations for different vertices to occur at the same time.

An example of a recursive simultaneous estimation of the function approximations and their respective key points for all vertices is as follows.

1. The first few key points and the corresponding approximation functions for each vertex are estimated independently, as in the above embodiments. The key points are selected up to a predetermined time point $E_1$, which is selected to give a sufficiently long interval to ensure that there are a few key points for at least some of the vertices.
2. Select a first vertex.
3. For the selected vertex, the first key point is identified and selected.
4. For the selected key point, the (adjusted) positions of all the other vertices at the same time are determined, using the functions derived in step 1.
5. For the positions of the vertices calculated as in step 4, the value of $D_t'$ (equation 2 above) is calculated and compared with a threshold. If $D_t'$ is greater than the threshold, the key point for the vertex under consideration is changed. More specifically, the key point is taken backwards stepwise, at each stage calculating the value of $D_t'$, with all vertices adjusted as in step 2, until $D_t'$ is less than the threshold. If $D'$ is smaller than the threshold, a similar stepwise extension of the key point is performed.
6. Steps 4 and 5 are repeated for the next key point as calculated in step 1 for the same vertex as in step 2. This key point is an end point, and the start point for the corresponding function is the point determined in step 5.
7. Step 6 is repeated for all key points for the vertex under consideration.
8. The next vertex is selected, and points 3 to 7 are repeated for this vertex.
9. Step 8 is repeated for all vertices in turn repeatedly, until the key points stop changing, or the changes are sufficiently small (ie they are below a predetermined threshold).
10. The overall time period is extended from $E_1$, the approximation functions are extended accordingly for each vertex independently, and then steps 2 to 9 are repeated.

If the whole time period is relatively short, it can be set to $E_1$, and step 9 omitted.

Tests have shown that the proposed technique give a significant improvement in the mean normalised error (averaged over all frames) over prior art techniques, where the error is defined as the number of pixels difference between the actual region and that estimated by the function approximation.

In the embodiment described above, a 1-dimensional function is approximated for each co-ordinate of each vertex separately. Alternatively, a 2-dimensional function could be derived for both co-ordinates for each vertex simultaneously. In the embodiment where a single co-ordinate is changed, the outline of the object either increases or decreases and the change in pixels is the change in area. However, if two-co-ordinates are treated simultaneously, the overall area value of the object outline might stay the same, but there has been a change in terms of the area (which pixels) of the original image that is covered by the original object and the pixels covered by the modified outline. The error value is calculated as a function of (eg a sum of) the number of pixels that are in the modified outline but not the original outline and the number of pixels that were in the original outline but not in the modified outline.

The descriptor is a representation of the movement of an object. It can be used, for example, to enable selection of objects in a video sequence, to index the sequence of images, for search, comparison and retrieval purposes, to identify or classify movement, for diagnostic purposes, for monitoring or analysis and many other uses. An example of an application of the invention is to enable an object in a playing video sequence to be clicked to bring up an associated web page, for example, with a description of the object. Instead of storing a descriptor of the object and its position for each image, which involves a large amount of data, the motion descriptor makes it possible to identify that the clicked point corresponds to the object, but involves storage of considerably less data.

This is because, for a given object, the location of the object in an earlier image is known, together with the motion descriptor (motion function) through subsequent images. Thus, for an image of interest at time t, the location of the object can be computed. This location can be compared with the position of a point or region in the image that is selected, for example, with a mouse and cursor, to determine if the object has been selected.

A system according to the invention may, for example, be provided in a video library. Alternatively, the databases may be sited remote from the control unit of the system, connected to the control unit by a temporary link such as a telephone line or by a network such as the internet. The video and descriptor databases may be provided, for example, in permanent storage or on portable data storage media such as CD-ROMs or DVDs.

Components of the system as described such as the selectors and comparators may be provided in software or hardware form. Although the invention has been described in the form of a computer system, it could be implemented in other forms, for example using a dedicated chip.

The invention can also be used, for example, for matching images of objects for verification purposes, or for filtering.

The invention is applicable to images in a sequence of images, such as images from a film or a video, or a collection of images that are associated in some way, such as being on the same web page.

The invention claimed is:

1. A method of representing motion of an object appearing in a sequence of images comprising:
   deriving for each image a set of representative points representing the location of the object, said representative points forming a polygon defining a representative area associated therewith;
   deriving a trajectory approximate function representing the trajectory of a representative point from said set of representative points, in two or more of said sequence of images, where a trajectory approximate function is derived for each of said representative points in said set of representative points, the trajectory approximate function providing a modification of the location of the respective representative point, thus providing a modified representative area; and
   calculating an error value for said trajectory approximate function for each of the representative points for an image, wherein the error value is calculated on the difference in area of the object as represented by the representative point and the area of the object with the representative point replaced by the respective approximate function value.

2. A method as claimed in claim 1 wherein the error value is based on the change in area in an image.

3. A method as claimed in claim 1 wherein the error value is based on the change in area in a plurality of images.

4. A method as claimed in claim 1 wherein a function approximation is derived for each co-ordinate of a representative point.

5. A method as claimed in claim 1 wherein a function approximation is done for representative points independently.

6. A method as claimed in claim 1 wherein a function approximation is done for two or more vertices in conjunction.

7. A method as claimed in claim 1 wherein the error value for an image is based on a function of the number of pixels that are in the modified object outline replacing a representative point by the function approximation value of the representative point but not the original outline and the number of pixels that are in the original outline but not in the modified outline.

8. A method of identifying selection of an object in an image in a sequence of images, wherein the object motion has a representation derived using a method as claimed in claim 1, the method comprising identifying a selected region of the image, determining the location of said object in said image using said motion descriptor, and comparing it with the selected region to determine if said object is selected.

9. An apparatus that determines and represents motion of an object appearing in a sequence of images comprising:
   a location device that derives for each image a set of representative points representing the location of the object said representative points forming a polygon defining a representative area associated therewith;
   a trajectory approximation device that derives a trajectory approximate function representing the trajectory of a representative point from said set of representative points, in two or more of said sequence of images, where a trajectory approximate function is derived for each of said representative points in said set of representative points, the trajectory approximate function providing a modification of the location of the respective representative point, thus providing a modified representative area; and
   a calculation device that calculates an error value for said trajectory approximate function for each of the representative points for an image,
   wherein the error value is calculated on the difference in area of the object as represented by the representative point and the area of the object with the representative point replaced by the respective approximate function value.

10. A computer system that determines and represents motion of an object appearing in a sequence of images comprising:
    a location device that derives for each image a set of representative points representing the location of the object, said representative points forming a polygon defining a representative area associated therewith;
    a trajectory approximation device that derives a trajectory approximate function representing the trajectory of a representative point from said set of representative points, in two or more of said sequence of images, where a trajectory approximate function is derived for each of said representative points in said set of representative points, the trajectory approximate function providing a modification of the location of the respective representative point, thus providing a modified representative area; and
    a calculation device that calculates an error value for said trajectory approximate function for each of the representative points for an image,
    wherein the error value is calculated on the difference in area of the object as represented by the representative point and the area of the object with the representative point replaced by the respective approximate function value.

11. A computer-readable storage medium storing computer-executable process steps for determining and representing motion of an object appearing in a sequence of images, the process steps comprising:
    deriving for each image a set of representative points representing the location of the object, said representative points forming a polygon defining a representative area associated therewith;
    deriving a trajectory approximate function representing the trajectory of a representative point from said set of representative points, in two or more of said sequence of images, where a trajectory approximate function is derived for each of said representative points in said set of representative points, the trajectory approximate function providing a modification of the location of the respective representative point, thus providing a modified representative area; and
    calculating an error value for said trajectory approximate function for each of the representative points for an image,
    wherein the error value is calculated on the difference in area of the object as represented by the representative point and the area of the object with the representative point replaced by the respective approximate function value.

* * * * *